US007729362B2

(12) United States Patent
Nam et al.

(10) Patent No.: US 7,729,362 B2

(45) Date of Patent: Jun. 1, 2010

(54) METHOD AND APPARATUS FOR PROCESSING PACKET IN HIGH SPEED ROUTER

(75) Inventors: Kook Jin Nam, Kyungki-do (KR); Hak Suh Kim, Daejeon (KR); Jae Young Kim, Daejeon (KR); Chul Hyung Zhung, Daejeon (KR); Bup Joong Kim, Daejeon (KR); Byung Jun Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 626 days.

(21) Appl. No.: 11/634,730

(22) Filed: Dec. 6, 2006

(65) Prior Publication Data

US 2007/0133560 A1 Jun. 14, 2007

(30) Foreign Application Priority Data

Dec. 7, 2005 (KR) ..................... 10-2005-0119124
May 9, 2006 (KR) ..................... 10-2006-0041694

(51) Int. Cl.
*H04L 12/28* (2006.01)

(52) U.S. Cl. ...................................... 370/400; 370/419

(58) Field of Classification Search ....................... None
See application file for complete search history.

(56) References Cited

U.S. PATENT DOCUMENTS

| | | | | |
|---|---|---|---|---|
| 6,101,181 | A * | 8/2000 | Passint et al. | 370/352 |
| 6,931,018 | B1 | 8/2005 | Fisher | |
| 7,050,431 | B2 * | 5/2006 | Tzeng | 370/389 |
| 7,382,778 | B2 * | 6/2008 | Chari et al. | 370/392 |
| 2003/0193965 | A1 * | 10/2003 | Higuchi et al. | 370/466 |
| 2004/0249803 | A1 * | 12/2004 | Vankatachary et al. | 707/3 |
| 2005/0213585 | A1 * | 9/2005 | Sturm et al. | 370/395.31 |
| 2006/0209688 | A1 * | 9/2006 | Tsuge et al. | 370/229 |

FOREIGN PATENT DOCUMENTS

| | | |
|---|---|---|
| KR | 1020040062343 A | 7/2004 |
| KR | 1020050075232 | 7/2005 |

* cited by examiner

*Primary Examiner*—Hong Cho
*Assistant Examiner*—Eunsook Choi
(74) *Attorney, Agent, or Firm*—Ladas & Parry LLP

(57) ABSTRACT

An apparatus for processing packets in a high speed router and a method thereof are provided. The high speed router includes a forward processor and a control processor where the forward processor having an input terminal processor and an output terminal processor. The output terminal processor manages a Layer 2 Address Table by dividing the Layer 2 Address Table into a layer 2 indirect address table and a layer 2 direct address table and by managing them. The indirect address table is directly indexed in the Next-hop Table of the input terminal processor table. The direct address table is composed of a hashing table for a destination IP address. Therefore, the system efficiency can be improved by reducing the memory which is used for storing the forwarding information table occupied by the forward processor and by reducing the IPC message between the control processor and the forwarding process.

21 Claims, 6 Drawing Sheets

METHOD AND APPARATUS FOR PROCESSING PACKET IN HIGH SPEED ROUTER

RELATED APPLICATION

The present application is based on, and claims priorities from, Korean Application Number 2005-119124, filed Dec. 7, 2005, and Korean Application Number 2006-41694 filed May 9, 2006 in the Korean Intellectual Property Office, the disclosures of which are incorporated herein by reference.

BACKGROUND OF THE INVENTION

1. Field of the Invention

The present invention relates to an apparatus for processing packets in a high speed router and a method thereof.

2. Description of the Related Art

Generally, in order to transmit an Internet protocol (IP) packet in an Ethernet, a layer 2 address of the IP packet should be known at final output terminal. In order to detect the layer 2 address of the opponent party, the address resolution protocol (ARP) is used in the Internet protocol version 4 (IPv4), and the neighbor discovery protocol (NDP) is used in the Internet protocol version 6 (IPv6).

Since a control processor driven by a routing protocol in a general router process packet-forwarding, the general router has a simple structure managing a routing table and a layer 2 address by one processor. In a high speed router, however, since each of a control processor, an input processor and an output processor performs its own roll and is driven by different protocols, each of the control processor, the input processor and the output processor has own Information Table. Therefore, it is necessary to perform complicated procedures to synchronize the Information Tables of the control processor, the input processor and the output processor in the high speed router.

FIG. 1 is a block diagram illustrating an internal structure of a high speed router according to the related art.

As shown in FIG. 1, the high speed router includes a control processor 100 and a forward processor 300. The forward processor 300 includes an input processor 310 having an input network processor, an output processor 340 having an output network processor 350 and a switch fabric 330.

The control processor 100 and the forward processor 300 are connected through an Ethernet switch 200 and exchange packets or inter processor communication (IPC) messages each other through the Ethernet switch 200.

Forwarding of input packets is actually performed by the input network processor 320 and output network processor 350 which are included in the input processor 330 and output processor 340 of the forward processor 300.

The input network processor 320 and output network processor 350 in the forward processor 300 are connected each other through the switch fabric 330, and the input processor 310 and the output processor 340 are connected each other through an internal bus such as PCI.

Meanwhile, a router may include a plurality of forward processors 300 according to its capacity.

Hereinafter, a conventional technology for creating a forwarding information table and for forwarding a packet using the forwarding Information Table in the high speed router will be described, briefly.

FIG. 2 is a block diagram illustrating a structure of Information Tables managed by each processor in the high speed router shown in FIG. 1 according to the related art. Since identical constitute elements in FIGS. 1 and 2 have identical or similar functions, the detailed descriptions thereof are omitted.

As shown in FIG. 2, the input processor 310 manages a Prefix Table 311 and a Next-hop Table 312, and the output processor 340 manages a Layer 2 Address Table 341 in the forward processor 300.

In the forward processor 300, the input processor 310 and input network processor 320 share the Prefix Table 311 and the Next-hop Table 312 of the input processor 310. The output network processor 350 and the output processor 340 share the Layer 2 address Table 341 of the output processor 340. Information stored in the Prefix Table 110, the network-hop table 120 and the Layer 2 Address Table 130 in the control processor 100 must be synchronized with information stored in the Prefix Table 311 and the Next-hop Table 312 of the input processor 310 and the Layer 2 Address Table 341 of the output processor 340 in the forward processor 300 to be identical each other.

In the input processor 310 of the forwarding processor 300, the entry of the Prefix Table 311 occupies one table entry for one prefix and is mapped to the Next-hop Table 312 in a multi-to-one manner.

The Next-hop Table 32 is mapped to the Layer 2 Address Table 314 of the output processor 340 in a one to one manner. However, in case of a direct routing where a destination address of a forwarding packet is same to an address of the next-hop, a packet may have a plurality of layer 2 addresses although the packet is included in a same prefix.

Accordingly, one table entry is not allocated to a corresponding prefix in the Prefix Table 311 of the input processor 310 according to the related art. Instead of allocating the one table entry to a prefix, one table entry is allocated to all of host addresses in the Prefix Table 311. For example, in case of 24 prefixes, the number of entries in the Prefix Table 311 maximally increases 256. It causes the number of the entries in the Next-hop Table 312 increased, accordingly. Such an increment of the number of the entries causes a problem of increasing a capacity of a memory in a router.

Also, in a control processor 100 where all information tables for forwarding are converged in one processor, the above described problems are not occurred even in case of the direct routing. It provides a cause that makes the IPC message for synchronizing the routing tables in the control processor 100 and the forward processor 300 complicated.

SUMMARY OF THE INVENTION

Present invention is directed to a method and an apparatus for processing packets in a high speed router that substantially obviates one or more problems due to limitations and disadvantages of the related art.

An object of the present invention is to provide an apparatus for processing packets in a high speed router for effectively performing packet-forwarding by eliminating an IPC message exchanged for synchronizing Layer 2 Address Tables between a control processor and an output processor and for improving efficiency of using a memory in case of a direct routing and a method thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an apparatus for processing a packet in a high speed router including a forward processor having an input terminal processor and an output terminal processor, and a control processor. Herein, the output terminal processor of the forward processor may mange a Layer 2 Address Table by dividing the Layer 2 Address Table into a layer 2 indirect address table directly indexed in a Next-hop Table of the input processor and a layer 2 direct address table composed as a hashing table for a destination IP (Internet Protocol) address of a corresponding packet, and managing the layer 2 indirect address table and the layer 2 direct address table.

The control processor may include a Prefix Table, a Next-hop Table and a Layer 2 Address Table. The input terminal processor of the forward processor may include a Prefix Table and a Next-hop Table. The output terminal processor of the forward processor may include an IPv4 packet queue and an IPv6 packet queue.

The Next-hop Table of the input terminal processor may have a flag or an index for identifying reference(s) of the output terminal processor between the layer 2 indirect address table and the layer 2 direct address table.

The input terminal processor may, when an ARP response or an NA packet are received from an external router, duplicate and transmit the packet(s) to the control processor and the output terminal processor for synchronizing the Layer 2 Address Table of the control processor with the layer 2 direct address table and the layer 2 indirect address table of the output terminal processor.

The output terminal processor may extract a destination IP address from a packet when a layer 2 direct address referring flag is set in a received packet from the input terminal processor, calculate a hashing value for a destination IP address, creates a layer 2 header if a layer 2 direct address table entry corresponding to the calculated hashing value is present, and forward the received packet.

The output terminal processor may transmit an ARP request packet to an external router if a packet stored in the packet queue is an IPv4 packet or transmit an NS packet to an external router if a packet stored in the packet queue is an IPv6 packet.

When the output terminal processor receives the ARP response for the ARP request packet or the NA packet for the NS packet from the input terminal processor, the output terminal processor may determine whether a corresponding entry is present in the layer 2 indirect address table. The output terminal processor may update the layer 2 indirect address table entry if the corresponding entry is present. Also, the output terminal processor may update the layer 2 direct address table entry if the corresponding entry is present in the layer 2 direct address table and add a new entry if the corresponding entry is not present in the layer 2 direct address table.

After updating or adding the corresponding entry, the output terminal processor may forward a packet stored in the IPv4 queue if a received packet from the input terminal processor is an ARP response packet and forward a packet stored in the IPv6 queue if a received packet from the input terminal processor is an NA packet.

When a layer 2 direct address referring flag is not set in a received packet, the output terminal processor may discard the received packet if a table entry is not present by referring to the layer 2 indirect address table.

When a layer 2 direct address referring flag is not set in a received packet from the input terminal processor, the output terminal processor may create a layer 2 header and forward a packet if a table entry and a value of a layer 2 address are present by referring to the layer 2 indirect address table. Or, the output terminal processor may store a received packet in the IPv4 queue or the IPv6 queue according to a destination IP address hashing value and transmit one of an ARP request packet and an NS packet according to a type of a packet to an external router if the table entry is present and the layer 2 address is not present.

According to another aspect of the present invention, there is provided an apparatus for processing a packet in a high speed router having an input terminal processor, a control processor and an output terminal processor, wherein the output terminal processor a) stores a packet to be forwarded into an IPv4 queue or an IPv6 queue according to a type of a packet if a destination IP address for a forwarding packet received from the input terminal processor is not registered in a layer 2 direct address table, and transmit an ARP request packet in case of an IPv4 packet or transmits an NS (neighbor solicitation) packet in case of an IPv6 packet, and b) performs a layer 2 address learning if the ARP response packet for the ARP request packet or the NA packet for the NS packet is received from the input terminal processor, updates the learned layer 2 address into a layer 2 indirect address table or a layer 2 direct address table, and sequentially forwards packets which are stored in the IPv4 packet queue or the IPv6 packet queue according to a type of a packet.

The input terminal processor may transmit a received packet to the control processor if an ARP request packet or an NS packet is received from an external router. Then, the input terminal processor may duplicate a received packet when an ARP response packet or an NA packet is received from an external router, transmit one of the duplicated packets to the control processor and transmit other to the output terminal processor.

According to still another aspect of the present invention, there is provided a method of processing a packet in a high speed router including an input terminal processor, a control processor and an output terminal processor, the method including, at the output terminal processor, storing a packet to be forwarded into an IPv4 queue or an IPv6 queue according to a type of a packet if a destination IP address for a forwarding packet received from the input terminal processor is not registered in a layer 2 direct address table, and transmitting an ARP request packet in case of an IPv4 packet or transmitting an NS (neighbor solicitation) packet in case of an IPv6 packet. Than, a layer 2 address learning is performed if an ARP response packet for the ARP request packet or the NA packet for the NS packet is received from the input terminal processor, the learned layer 2 address is updated into a layer 2 indirect address table or a layer 2 direct address table, and packets which are stored in the IPv4 packet queue or the IPv6 packet queue according to a type of a packet are sequentially transmitted.

The method may further includes determining whether a layer 2 direct address referring flag is set in a packet received from the input terminal processor, extracting a destination IP address from the received packet and calculating a hashing value for the extracted destination IP address when the layer 2 direct address referring flag is set in the received packet, and creating a layer 2 header and forwarding a received packet if a layer 2 direct address table entry for the calculated hashing value is present.

The method may further include determining whether a layer 2 direct address referring flag is set in a packet received from the input terminal processor, extracting a destination IP address from the received packet and calculating a hashing value for the extracted destination IP address if the layer 2 direct address flag is set in the received packet, and storing a packet into one of the IPv4 packet queue and the IPv6 packet queue according to a destination IP address hashing value if a layer 2 direct address table entry for the calculated hashing value is not present, and transmitting an ARP request packet if the received packet is an IPv4 packet or transmitting an NS packet if the received packet is an IPv6 packet.

The method may further include determining whether a layer 2 direct address referring flag is set in a packet received from the input terminal processor, determining whether a table entry is present or not by referring to the layer 2 indirect address table if the layer 2 direct address referring flag is not set in the received packet, and discarding a received packet if the table entry is not present, and creating a layer 2 header and forwarding a packet to a destination IP address if a layer 2 indirect address table entry and a value of a layer 2 address is present.

The method may further include determining whether a layer 2 direct address referring flag is set in a packet received from the input terminal processor, at the output terminal processor, determining whether a table entry is present in the layer 2 indirect address table by referring to the layer 2 indirect address table if the layer 2 direct address referring flag is set in the received packet from the input terminal processor, discarding a received packet if an entry is not present, and storing a received packet into one of an IPv4 packet queue and an IPv6 packet queue according to a destination IP address hashing value and transmitting one of an ARP request packet and an NS packet to the input terminal processor according to a type of a packet if a layer 2 indirect address table entry is present and a value of a layer 2 address is not present.

The method may further include at the output terminal processor, determining whether a corresponding entry is present in the layer 2 indirect address table and a layer 2 direct address table when the ARP response for the ARP request or an NA packet for the NS packet is received from the input terminal processor, and updating the layer 2 indirect address table entry if a corresponding entry for a received packet is present in the layer 2 indirect address table, updating the layer 2 direct address table entry if a corresponding entry is not present in the layer 2 indirect address table and is present in the layer 2 direct address table, and adding an new entry to the layer 2 direct address table when a corresponding entry is not present in the layer 2 direct address table.

The method may further include, at the output terminal processor, after updating or adding the entry, forwarding packets stored in the IPv4 packet queue if a received packet is an ARP response packet and forwarding packets stored in the IPv6 packet queue if the received packet is the ARP response packet.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
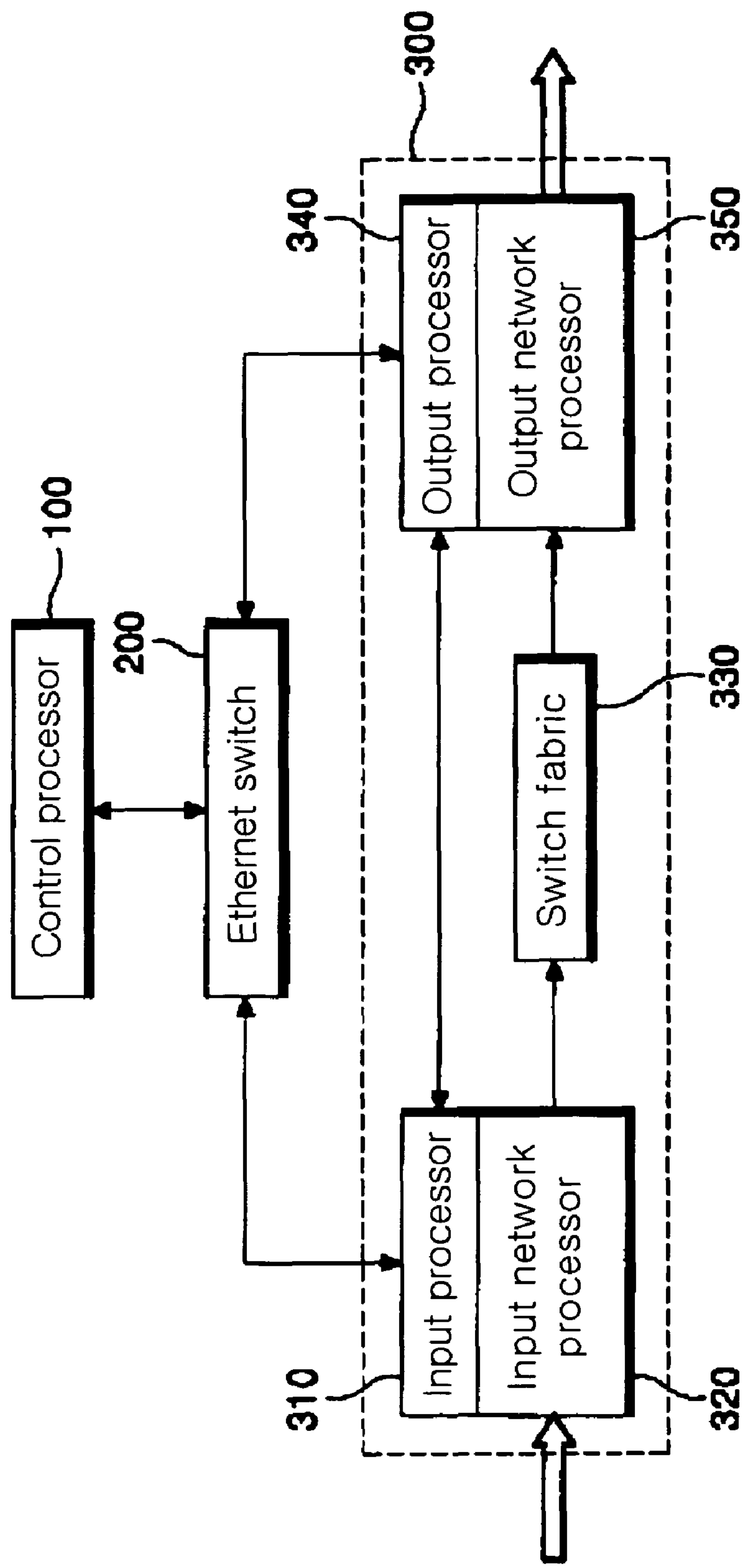
FIG. 1 is a block diagram illustrating an internal structure of a high speed router according to the related art.
Figure 2:
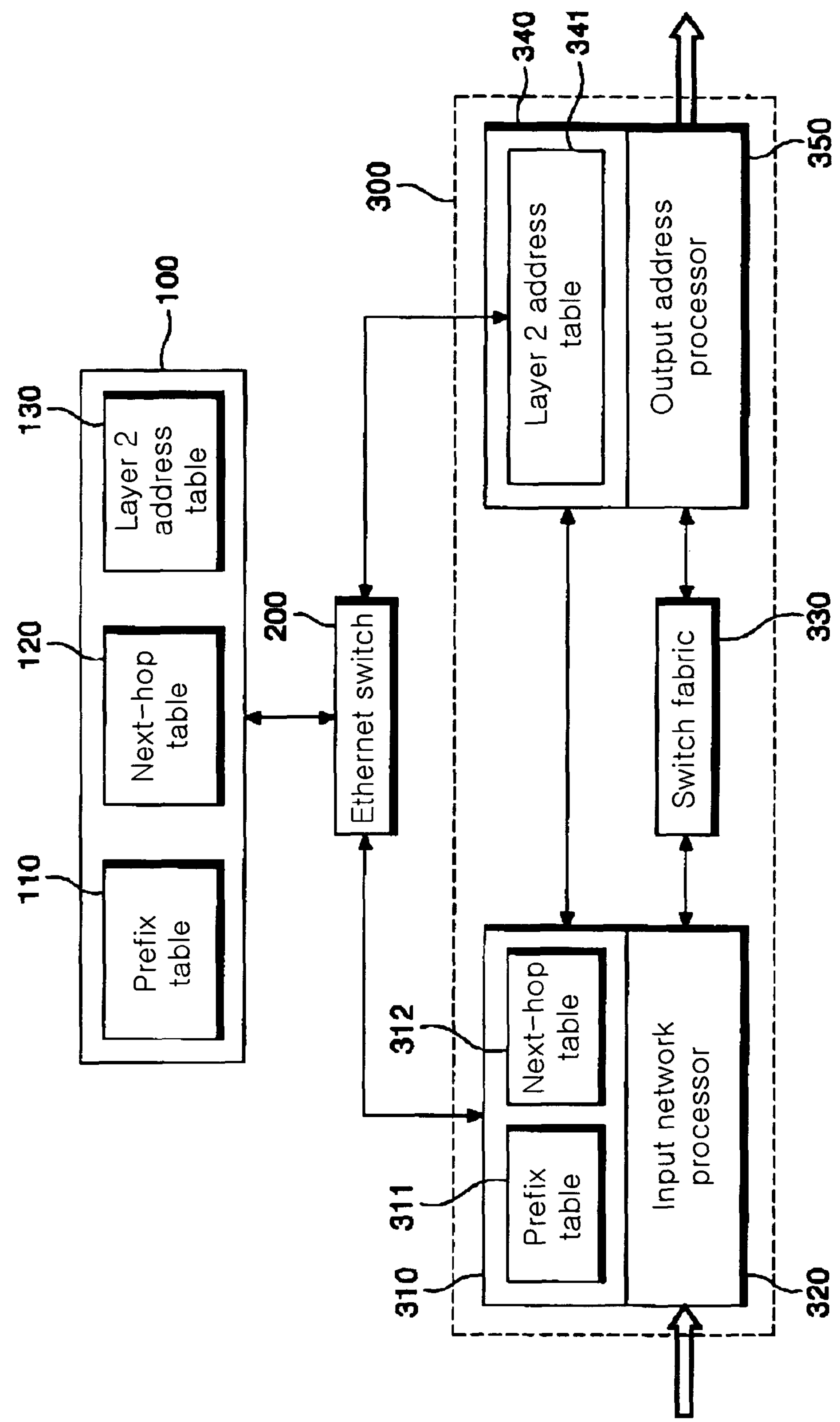
FIG. 2 is a block diagram illustrating a structure of information tables managed by each processor in the high speed router shown in FIG. 1 according to the related art.

Reference will now be made in detail to the preferred embodiments of the present invention, examples of which are illustrated in the accompanying drawings. Detailed descriptions of constituent elements of the present invention identical to conventional constituent elements illustrated in FIGS. 1 and 2 are omitted, and configuration and operations of necessary constituent elements of the present invention will be described in detail.

Figure 3:
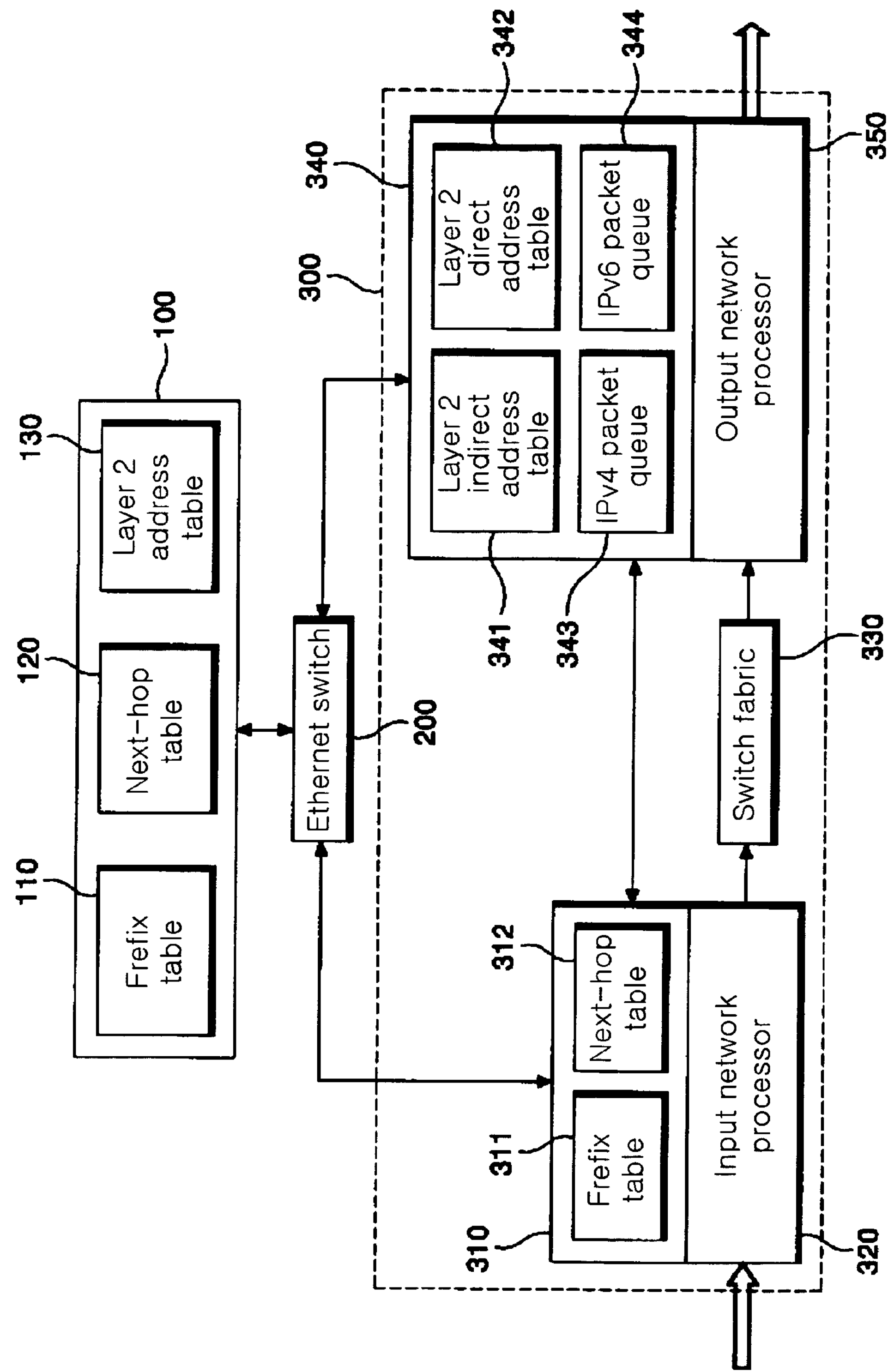
FIG. 3 is a block diagram illustrating an apparatus for processing a packet in a high router according to an embodiment of the present invention.

FIG. 3 is a block diagram illustrating an apparatus for processing a packet in a high speed router according to an embodiment of the present invention.

Referring to FIG. 3, the high speed router according to the present embodiment includes a control processor 100, an Ethernet switch 200, and a forward processor 300.

The control processor 100 includes a Prefix Table 110, a Next-hop Table 120, and a Layer 2 Address Table 130.

The forward processor 300 includes an input processor 310, an output processor 340, an input network processor 320, an output network processor 350 and a switch fabric 330.

The input processor 310 of the forward processor 300 includes a Prefix Table 311 and a Next-hop Table 312, and the output processor 340 includes a layer 2 indirect address table 341, a layer 2 direct address table 342, an IPv4 packet queue 343 and an IPv6 packet queue 344.

As described above, the Layer 2 Address Table of the output processor 340 in the forward processor 300 according to the present embodiment is composed of two independent tables, a layer 2 indirect address table 341 and a layer 2 direct address table 342. The layer 2 indirect address table 341 is directly indexed in the Next-hop Table 312 of the input processor 310, and the layer 2 direct address table 342 is composed as a hashing table for a destination Internet protocol (IP) address. Also, a flag is additionally included in the Next-hop Table 312 of the input processor 310 in order to identify one of the layer 2 indirect address table 341 and the layer 2 direct address table 342 in the output processor 340 to refer.

Meanwhile, the forward processor 300 includes the IPv4 packet queue 343 and the IPv6 packet queue 344 in order to store the packets according to the type of packet until a layer 2 address is learned.

Hereinafter, an operation of processing a packet in a high speed router according to the present invention will be described in detail.

At first, when a packet to forward is arrived at the output processor 340, the output network processor 350 determines whether the destination address of the arrived packet is registered at the layer 2 indirect address table 341 or the layer 2 direct address table 342 in the output processor 340. If the destination address is not registered, the packet to forward is stored in one of the IPv4 packet queue 343 or the IPv6 packet queue 344 according to the type thereof.

At this time, the output network processor 350 transmits an address resolution protocol (ARP) request packet to the input network processor 320 if the arrived packet is the IPv4 packet. If the arrived packet is an IPv6 packet, the output network processor 350 transmits a neighbor solicitation (NS) packet.

When the input network processor 320 receives the ARP request packet or the NS packet, the input network processor 320 transmits the ARP request packet or the NS packet to the control processor 100 through the Ethernet switch 200.

When the input network processor 320 receives the ARP request packet or the NS packet, the input network processor 320 duplicates the received packet, transmits one of duplicated packets to the control processor 100 and transmit other to the output network processor 350. Accordingly, the layer 2 address learning is progressed according to the transmitted packet from the input network processor 320 in the control processor 100 and the output network processor 350.

Then, the control processor 100 updates the learned layer 2 address to the Layer 2 Address Table 130, and the output network processor 350 updates the learned layer 2 address to the layer 2 direct address table 342 of the output processor 340.

The output network processor 350 forwards packets stored in the IPv4 packet queue 343 or the IPv6 packet queue 344 using destination addresses stored in the layer 2 direct address table 342 of the output processor 340.

Figure 4:
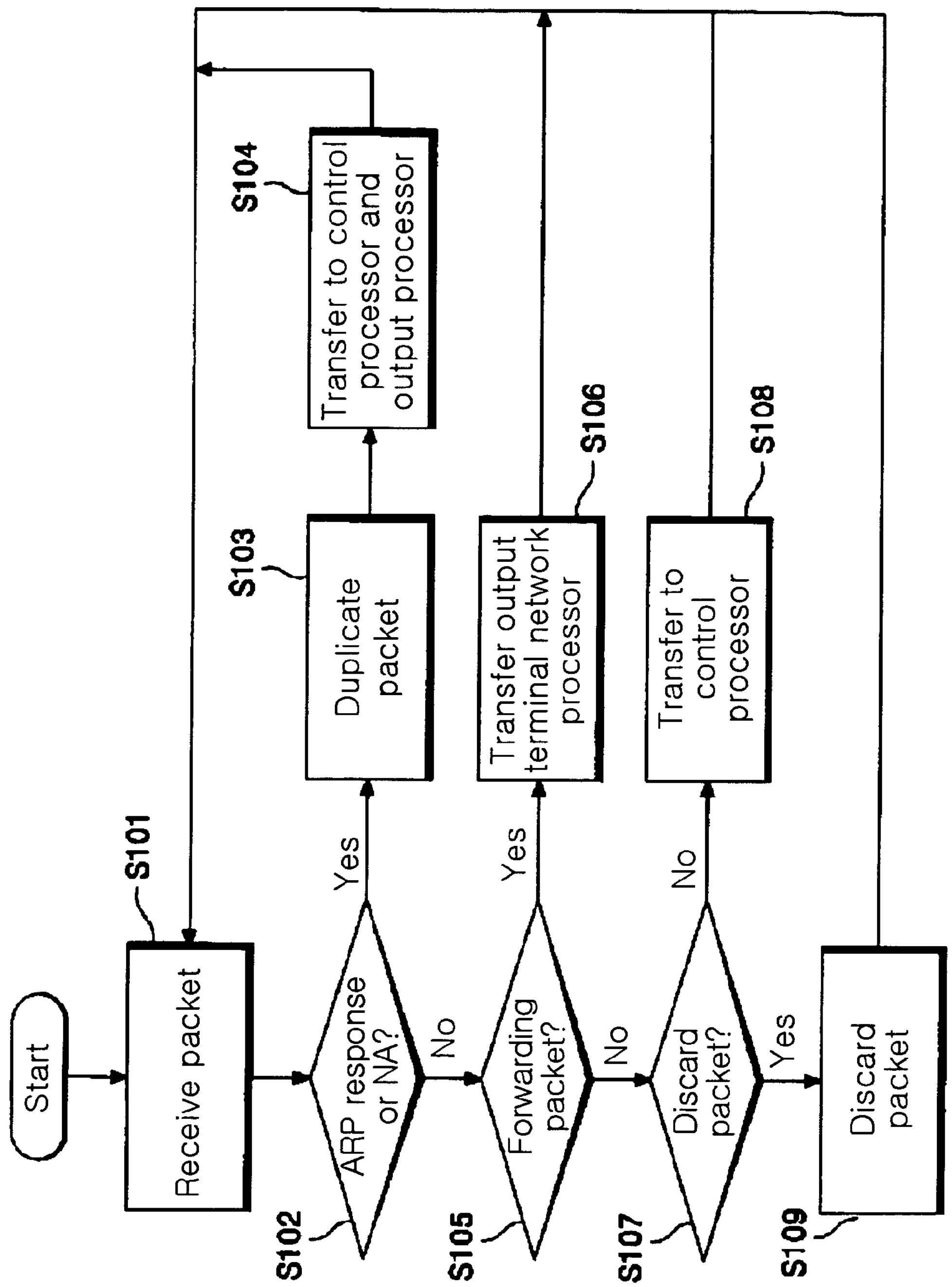
FIG. 4 is a flowchart of a method of processing a packet in an input terminal processor of a high speed router according to an embodiment of the present invention.
Figure 5:
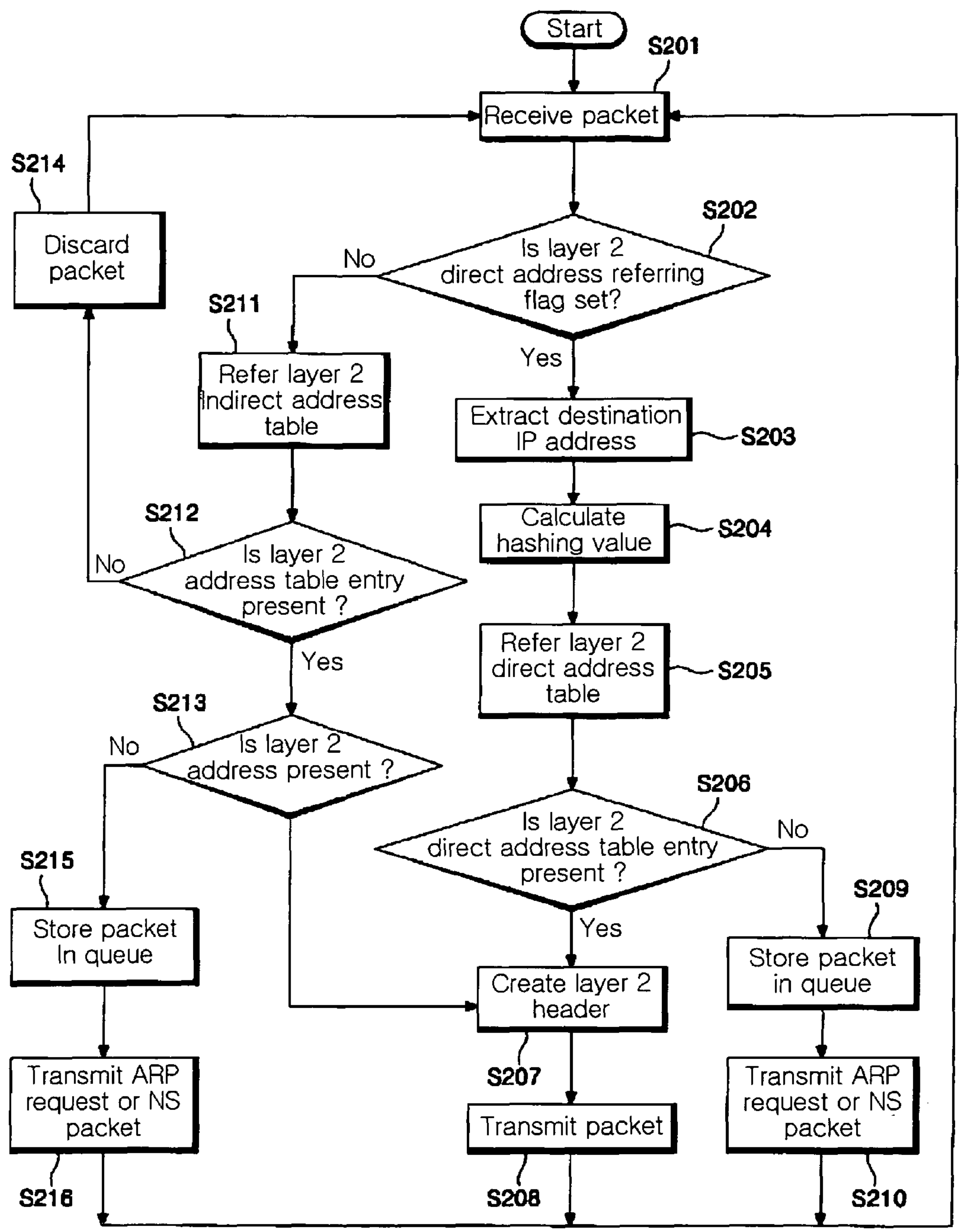
FIG. 5 is a flowchart of a method of processing a packet in the output network processor 350 according to an embodiment of the present invention.
Figure 6:
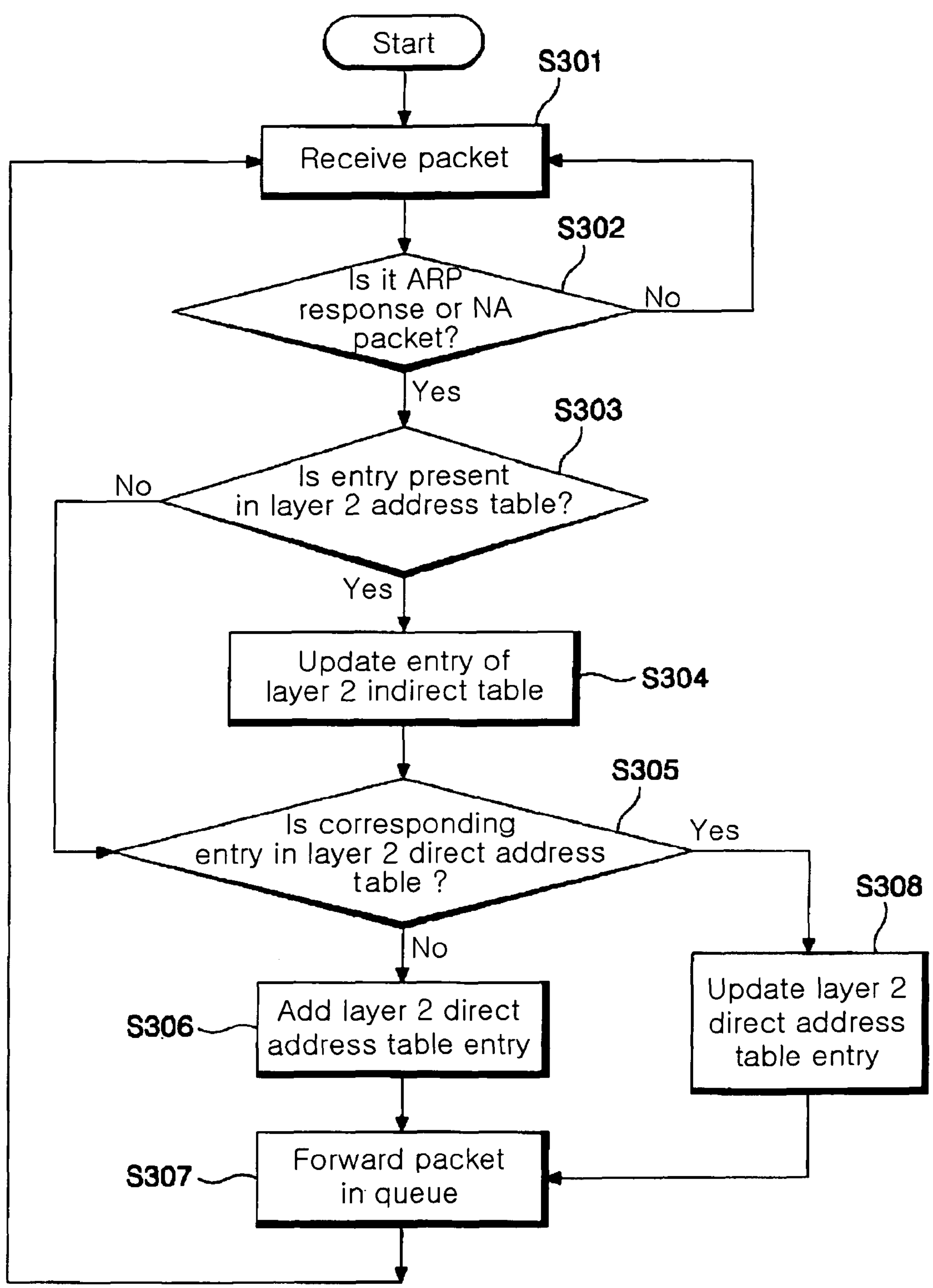
FIG. 6 is a flowchart of a method of processing an ARP response or an NA packet in an output terminal processor in a high speed router according to an embodiment of the present invention.

With reference to FIGS. 4 through 6, a method of forwarding a packet corresponding to a packet forwarding operation in a high speed router according to an embodiment of the present invention will be described in detail.

FIG. 4 is a flowchart of a method of processing a packet in an input terminal processor of a high speed router according to an embodiment of the present invention.

Referring to FIG. 4, the input network processor 320 of the high speed router receives a packet from an external device in operation S101.

When the packet is received, the input network processor 320 determines whether the received packet is the ARP response packet or an NA packet in operation S102.

If the received packet is the ARP response packet or the NA packet, the received packet is duplicated and the duplicated packets are transmitted to the control processor 100 and the output processor 340 in operations S103 and S104.

If the received packet is not either of the ARP response packet and the NA packet, the input network processor 320 determines whether the received packet is a packet to forward or not by referring the Prefix Table 311 of the input processor 310. If the received packet is the packet to forward, the received packet is transmitted to the output network processor 350. On the contrary, if the received packet is not the packet to forward in the operation S105, it determines whether the received packet is a packet to discard or not in operation S107.

If the received packet is the packet to discard, the received packet is discarded in operation S109. On the contrary, the received packet is not the packet to discard, the received packet is transmitted to the control processor 100 in operation S108.

In case of transmitting the received forwarding packet to the output network processor 350 in the operation S106, the received packet is transmitted through the switch fabric 330, and the transmitted packet includes an indexing value pointing to the layer 2 indirect address table 341 of the output processor 340. Also, a flag denoting whether the layer 2 direct address table 342 will be referenced or not is transmitted to the output network processor 350 with the indexing value pointing to the layer 2 indirect address table 341 of the output processor 340. It is preferable that a predetermined index value such as zero may be used instead of the flag.

Hereinafter, a method of processing a packet in the output network processor 350 with the packet received from the input network processor 320 will be described with reference to FIG. 5.

FIG. 5 is a flowchart of a method of processing a packet in the output network processor 350 according to an embodiment of the present invention.

Referring to FIG. 5, a packet is received from the input network processor 320 through the switch fabric 330 in operation S201.

After receiving the packet, the output network processor 350 determines whether a layer 2 direct address referring flag is set or not based on the information of the received packet in operation S202.

If the layer 2 direct address referring flag is set, an destination IP address is extracted from the received packet in operation S203. Then, a hashing value is calculated from the extracted IP address in operation S204, and the output network processor 350 determines whether a table entry for a layer 2 direct address exists or not by referring the layer 2 direct address table 343 of the output processor 340 in operations S205 and S206.

If the layer 2 direct address table entry exists in the operation S206, a layer 2 header is created using the information of the layer 2 direct address table entry and the received packet is transmitted to the destination in operations S207 and S208.

On the contrary, if the layer 2 direct address table entry does not exist in the operation S206, a packet to forward is stored into one of the IPv4 packet queue and the IPv6 packet queue of the output processor 340 according to the type of the packet in operation S209. Then, if the packet is the IPv4 packet, an ARP request packet is transmitted or if the packet is the IPv6 packet, an NS packet is transmitted in operation S210.

The packet queues are independently provided for the IPv4 packet and the IPv6 packet, and each of the packet queues is composed as a hashing table for the IP address. If a layer 2 address is learned for a corresponding IP address, the packets stored in the queues 343 and 344 are transmitted. The number of the queues can be controlled according to a capacity of a memory in a router. If there is not response for the ARP request packet or the NS packet for a predetermined time, the packets in the queues are discarded.

Meanwhile, if the layer 2 direct address referencing flag is not set in the operation S202, it determines whether the Layer 2 Address Table entry is present or not by referring to the layer 2 indirect address table 341 in operation S211 and S212.

If the Layer 2 Address Table entry to refer is not in the layer 2 indirect address table 341, a corresponding packet is discarded in operation S214. On the contrary, if the Layer 2 Address Table entry to refer is in the layer 2 indirect address table 341, it determines whether a layer 2 address is present or not based on the entry information in operation S213.

If the layer 2 address is not present in the operation S213, a corresponding packet is stored in one of the IPv4 packet queue 343 and the IPv6 packet queue 344 according to the type of the packet in operation S215. If the packet is the IPv4 packet, the ARP request packet is transmitted, and if the packet is the IPv6 packet, the NS packet is transmitted in operation S216.

On the contrary, if the layer 2 address is present in the Layer 2 Address Table entry in the operation S213, a layer 2 header is created in operation S207 and the received packet is transmitted to a next router in operation S208.

Hereinafter, a method of layer 2 address learning in an output processor 340 will be described with reference to FIG. 6.

FIG. 6 is a flowchart of a method of processing an ARP response or an NA packet in an output terminal processor in a high speed router according to an embodiment of the present invention.

As shown in FIG. 6, when a packet is received from the input network processor 320 in operation S301, the output processor 340 determines whether the received packet is the ARP response packet or the NA packet in operation S302.

If the received packet is not one of the ARP response packet and the NA packet, the output processor 340 ignores the received packet and continuously receives packets from the input network processor 320.

If the received packet is one of the ARP response and the NA packet in the operation S320, it determines whether a corresponding entry for a destination address of a corresponding packet is present in the layer 2 indirect address table 341 in operation S303.

If the corresponding entry is present in the layer 2 indirect address table 342, the corresponding entry of the layer 2 direct address table 342 is updated in operation S308. On the contrary, if the corresponding entry is not present in the layer 2 indirect address table 342, the output processor 340 adds a new entry to the layer 2 direct address table 342 in operation S306.

After updating the corresponding entry into the layer 2 direct address table 342 or adding the new entry as described above in operations S306 and S308, the output processor 340 sequentially forwards packets stored in the IPv4 packet queue 343 or the IPv6 packet queue 344 to the destination IP address in operation S307.

On the contrary, if the corresponding entry for the received packet is not present in the layer 2 dielectric in the operation S303, the output processor 340 is feed-backed to the operation S305 and performs the operations S306, S307 and S308.

According to the apparatus and method for processing a packet in a high speed router according to the present invention, the packet related to the address resolution protocol (ARP) and the neighbor discovery protocol (NDP) is duplicated in the forward processor of the input terminal processor, and one of the duplicated packet is transmitted to the control processor and other is transmitted to the output processor. In the output terminal processor, the Layer 2 Address Table is managed by dividing the Layer 2 Address Table into two independent tables, the indirect address table and the direct address table. The indirect address table is directly indexed in the Next-hop Table of the input terminal processor table. The direct address table is composed of a hashing table for a destination IP address. Therefore, the system efficiency can be improved by reducing the memory which is used for storing the forwarding information table occupied by the forward processor and by reducing the IPC message between the control processor and the forwarding process.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus for processing a packet in a high speed router, comprising:

a forward processor having an input terminal processor and an output terminal processor; and a control processor, wherein the output terminal processor of the forward processor manages a Layer 2 Address Table by dividing the Layer 2 Address Table into a layer 2 indirect address table directly indexed in a Next-hop Table of the input processor and a layer 2 direct address table composed as a hashing table for a destination IP (Internet Protocol) address of a corresponding packet and managing the layer 2 indirect address table and the layer 2 direct address table, and wherein the Next-hop Table of the input terminal processor has a flag or an index for identifying reference of the output terminal processor between the layer 2 indirect address table and the layer 2 direct address table.

2. The apparatus of claim 1, wherein the control processor includes a Prefix Table, a Next-hop Table and a Layer 2 Address Table.

3. The apparatus of claim 1, wherein the input terminal processor of the forward processor Includes a Prefix Table and a Next-hop Table.

4. The apparatus of claim 1, wherein the output terminal processor of the forward processor further includes packet queues for storing packets according to a type of each packet until a Layer 2 Address Table is learned.

5. The apparatus of claim 4, wherein the packet queues are an IPv4 packet queue and an IPv6 packet queue.

6. The apparatus of any one of claims 1 and 3, wherein the input terminal processor transmits a packet, to be forwarded to the output terminal processor, by referring to the Prefix Table.

7. The apparatus of any one of claim 1 or 3, wherein the input terminal processor duplicates a packet when an ARP (address resolution protocol) response or an NA (neighbor advertisement) packet are received from an external router, and transmits the duplicated packets to the control processor and the output terminal processor for synchronizing the Layer 2 Address Table of the control processor with the layer 2 direct address table and the layer 2 indirect address table of the output terminal processor.

8. The apparatus of any one of claims 1 and 4, wherein the output terminal processor extracts a destination IP address from a packet when a layer 2 direct address referring flag is set in a received packet from the input terminal processor, calculates a hashing value for a destination IP address, creates a layer 2 header if a layer 2 direct address table entry corresponding to the calculated hashing value is present, and forwards the received packet.

9. The apparatus of claim 8, wherein the output terminal processor transmits an ARP (address resolution protocol) request packet to an external router if a packet stored in the packet queue is an IPv4 packet or transmits an NS (neighbor solicitation) packet to an external router if a packet stored in the packet queue is an IPv6 packet.

10. The apparatus of claim 9, wherein when the output terminal processor receives an ARP (address resolution protocol) response for the ARP request packet or an NA (neighbor advertisement) packet for the NS packet from the input terminal processor, the output terminal processor determines whether a corresponding entry is present in the layer 2 indirect address table, updates the layer 2 indirect address table entry if the corresponding entry is present, updates the layer 2 direct address table entry if the corresponding entry is present in the layer 2 direct address table, and adds an new entry if the corresponding entry is not present in the layer 2 direct address table.

11. The apparatus of claim 10, wherein after updating or adding the corresponding entry, the output terminal processor forwards a packet stored in the IPv4 queue if a received packet from the input terminal processor is the ARP response packet and forwards a packet stored in the IPv6 queue if a received packet from the input terminal processor is the NA packet.

12. The apparatus of anyone of claims 1 and 4, wherein when a layer 2 direct address referring flag is not set in a received packet, the output terminal processor discards the received packet if a table entry is not present by referring to the layer 2 indirect address table.

13. The apparatus of anyone of claims 1 and 4, wherein the output terminal processor, when a layer 2 direct address referring flag is not set in a received packet from the input terminal processor, creates a layer 2 header and forwards a packet if a table entry and a value of a layer 2 address are present by referring to the layer 2 indirect address table, or when the table entry is present and the layer 2 address is not present, the output terminal processor stores a received packet in the IPv4 queue or the IPv6 queue according to a destination IP address hashing value and transmits one of an ARP (address resolution protocol) request packet and an NS (neighbor solicitation) packet according to a type of a packet to an external router.

14. An apparatus for processing a packet in a high speed router comprising:

an input terminal processor;

a control processor; and an output terminal processor, wherein the output terminal processor is configured to:

store a packet to forward into one of an IPv4 queue and an IPv6 queue according to a type of a packet if a destination IP address for a forwarding packet received from the input terminal processor is not registered in a layer 2 direct address table;

transmit an ARP (address resolution protocol) request packet in case of an IPv4 packet or transmit an NS (neighbor solicitation) packet in case of an IPv6 packet;

perform a layer 2 address learning if an ARP (address resolution protocol) response packet for the ARP request packet or an NA (neighbor advertisement) packet for the NS packet is received from the input terminal processor;

update the learned layer 2 address into a layer 2 indirect address table or the layer 2 direct address table;

sequentially forward packets which are stored in the IPv4 packet queue or the IPv6 packet queue according to a type of a packet;

determine whether a layer 2 direct address referring flag is set in a packet received from the input terminal processor;

extract a destination IP address from the received packet and calculate a hashing value for the extracted destination IP address when the layer 2 direct address referring flag is set in the received packet; and create a layer 2 header and forwarding a received packet if a layer 2 direct address table entry for the calculated hashing value is present.

15. The apparatus of claim 14, wherein the input terminal processor, when the ARP request packet or the NS packet is received from an external router, transmits a received packet to the control processor, and duplicates a received packet when the ARP response packet or the NA packet is received from an external muter, transmits one of the duplicated packets to the control processor and transmit other to the output terminal processor.

16. A method of processing a packet in a high speed router including an input terminal processor, a control processor and an output terminal processor, the method comprising:

at the output terminal processor, storing a packet to be forwarded into an IPv4 queue or an IPv6 queue according to a type of a packet if a destination IP address for a forwarding packet received from the input terminal processor is not registered in a layer 2 direct address table, and transmitting an ARP (address resolution protocol) request packet in case of an IPv4 packet or transmitting an NS (neighbor solicitation) packet in case of an IPv6 packet; and at the output terminal processor, performing a layer 2 address learning if an ARP (address resolution protocol) response packet for the ARP request packet or an NA (neighbor advertisement) packet for the NS packet is received from the input terminal processor, updating the learned layer 2 address into a layer 2 indirect address table or the layer 2 direct address table, and sequentially forwarding packets which are stored in the IPv4 packet queue or the IPv6 packet queue according to a type of a packet;

determining whether a layer 2 direct address referring flag is set in a packet received from the ipaut terminal processor;

extracting a destination IP address from the received packet and calculating a hashing value for the extracted destination IP address when the layer 2 direct address referring flag is set in the received packet; and creating a layer 2 header and forwarding a received packet if a layer 2 direct address table entry for the calculated hashing value is present.

17. The method of claim 16, further comprising:

determining whether a layer 2 direct address referring flag is set in a packet received from the input terminal processor;

extracting a destination IP address from the received packet and calculating a hashing value for the extracted destination IP address if the layer 2 direct address flag is set in the received packet; and storing a packet into one of the IPv4 packet queue and the IPv6 packet queue according to a destination IP address hashing value if a layer 2 direct address table entry for the calculated hashing value is not present, and transmitting the ARP request packet if the received packet is an IPv4 packet or transmitting the NS packet if the received packet is an IPv6 packet.

18. The method of claim 16, further comprising:

determining whether a layer 2 direct address referring flag is set in a packet received from the input terminal processor;

determining whether a table entry is present or not by referring to the layer 2 indirect address table if the layer 2 direct address referring flag is not set in the received packet; and discarding a received packet if the table entry is not present, and creating a layer 2 header and forwarding a packet to a destination IP address if a layer 2 indirect address table entry and a value of a layer 2 address is present.

19. The method of claim 16, further comprising:

determining whether a layer 2 direct address referring flag is set in a packet received from the input terminal processor;

at the output terminal processor, determining whether a table entry is present in the layer 2 indirect address table by referring to the layer 2 indirect address table if the layer 2 direct address referring flag is set in the received packet from the input terminal processor;

at the output terminal processor, discarding a received packet if an entry is not present, and storing a received packet into one of an IPv4 packet queue and an IPv6 packet queue according to a destination IP address hashing value and transmitting one of the ARP request packet and the NS packet to the input terminal processor according to a type of a packet if a layer 2 indirect address table entry is present and a value of a layer 2 address is not present.

20. The method of claim 19, further comprising:

at the output terminal processor, determining whether a corresponding entry is present in the layer 2 indirect address table and a layer 2 direct address table when the ARP response for the ARP request or the NA packet for the NS packet is received from the input terminal processor; and updating the layer 2 indirect address table entry if a corresponding entry for a received packet is present in the layer 2 indirect address table, updating the layer 2 direct address table entry if a corresponding entry is not present in the layer 2 indirect address table and is present in the layer 2 direct address table, and adding an new entry to the layer 2 direct address table when a corresponding entry is not present in the layer 2 direct address table.

21. The method of claim 20, further comprising:

at the output terminal processor, after updating or adding the entry, forwarding packets stored in the IPv4 packet queue if a received packet is the ARP response packet and forwarding packets stored in the IPv6 packet queue if the received packet is the NA packet.

* * * * *